United States Patent
Subramanian et al.

(10) Patent No.: US 8,599,844 B2
(45) Date of Patent: Dec. 3, 2013

(54) SYSTEM AND METHOD FOR FLEXIBLE MEMORY SYSTEM CONFIGURATION AND ACCESS

(75) Inventors: Krishnamurthy Subramanian, Mountain View, CA (US); Raja Jayakumar, Fremont, CA (US); Jason Lee, Palo Alto, CA (US)

(73) Assignee: Force10 Networks, Inc., San Jose, CA (US)

( * ) Notice: Subject to any disclaimer, the term of this patent is extended or adjusted under 35 U.S.C. 154(b) by 816 days.

(21) Appl. No.: 12/722,593

(22) Filed: Mar. 12, 2010

(65) Prior Publication Data

US 2011/0222547 A1 Sep. 15, 2011

(51) Int. Cl.
*H04L 12/56* (2006.01)
*H04L 12/28* (2006.01)

(52) U.S. Cl.
USPC ............ 370/389; 370/252; 370/419; 370/463

(58) Field of Classification Search
USPC .................. 370/252, 289, 419, 463
See application file for complete search history.

(56) References Cited

U.S. PATENT DOCUMENTS 6,278,530 B1 * 8/2001 Ulichney et al. ............ 358/3.13

* cited by examiner

*Primary Examiner* — John Pezzlo
(74) *Attorney, Agent, or Firm* — Haynes and Boone, LLP

(57) ABSTRACT

A packet network device includes a packet network processor memory system for storing information used to process and forward packets of information in and through the network device. The information is included in look-up tables whose entries can be mapped either horizontally or vertically into the memory system. In the event that the entries are mapped horizontally, a complete entry can be access at a single memory location and in the event that the entries are mapped vertically, the entries can be accessed at one or more memory locations.

19 Claims, 5 Drawing Sheets

| MEMORY 220-0 | MEMORY 220-1 | MEMORY 220-2 | MEMORY 220-3 |
|---|---|---|---|
| L2 FIB 0[0:1] | | NHOP 0[0] | L2 FIB 0[2] |
| L2 FIB 1[0:1] | | NHOP 1[0] | L2 FIB 1[2] |
| ... | ... | ... | ... |
| L2 FIB (2n-1)[0:1] | | NHOP n[0] | L2 FIB (2n-1)[2] |
| L2 FIB 2n[0:1] | | NHOP n[1] | L2 FIB 2n[2] |
| | L2 ACL 0[0] | | L2 ACL 0[1] |
| | L2 ACL 1[0] | | L2 ACL 1[1] |
| | ... | | ... |
| IN VLAN 0 | L2 ACL 2m[0] | | L2 ACL 2m[1] |
| ... | | | |
| IN VLAN m | | | |
| EG VLAN 0[0] | | EG VLAN 0[1] | |
| ... | | ... | |
| EG VLAN m[0] | | EG VLAN m[1] | |

| TABLE INDEX | BASE POINTER | | | | OFFSET REG. POINTER | | | | NEXT CYCLE |
|---|---|---|---|---|---|---|---|---|---|
| | B0 | B1 | B2 | B3 | B0 | B1 | B2 | B3 | |
| MPCT[0] ← ENTRY POINT 0 | L2FIB | L2FIB | NULL | L2FIB | L2FIB | L2FIB | NULL | L2FIB | MPCT[1] |
| MPCT[1] | EGVL | L2ACL | EGVL | L2ACL | EGVL | L2ACL | EGVL | L2ACL | MPCT[2] |
| MPCT[2] | INVL | NULL | NULL | NULL | INVL | NULL | NULL | NULL | NULL |
| MPCT[3] ← ENTRY POINT 1 | L2FIB | L2FIB | NH | L2FIB | L2FIB | L2FIB | NH | L2FIB | MPCT[4] |
| MPCT[4] | INVL | NULL | NH+1 | NULL | INVL | NULL | NH | NULL | MPCT[5] |
| MPCT[5] | EGVL | L2ACL | EGVL | L2ACL | EGVL | L2ACL | EGVL | L2ACL | NULL |

ENTRY POINT 2

Fig. 4

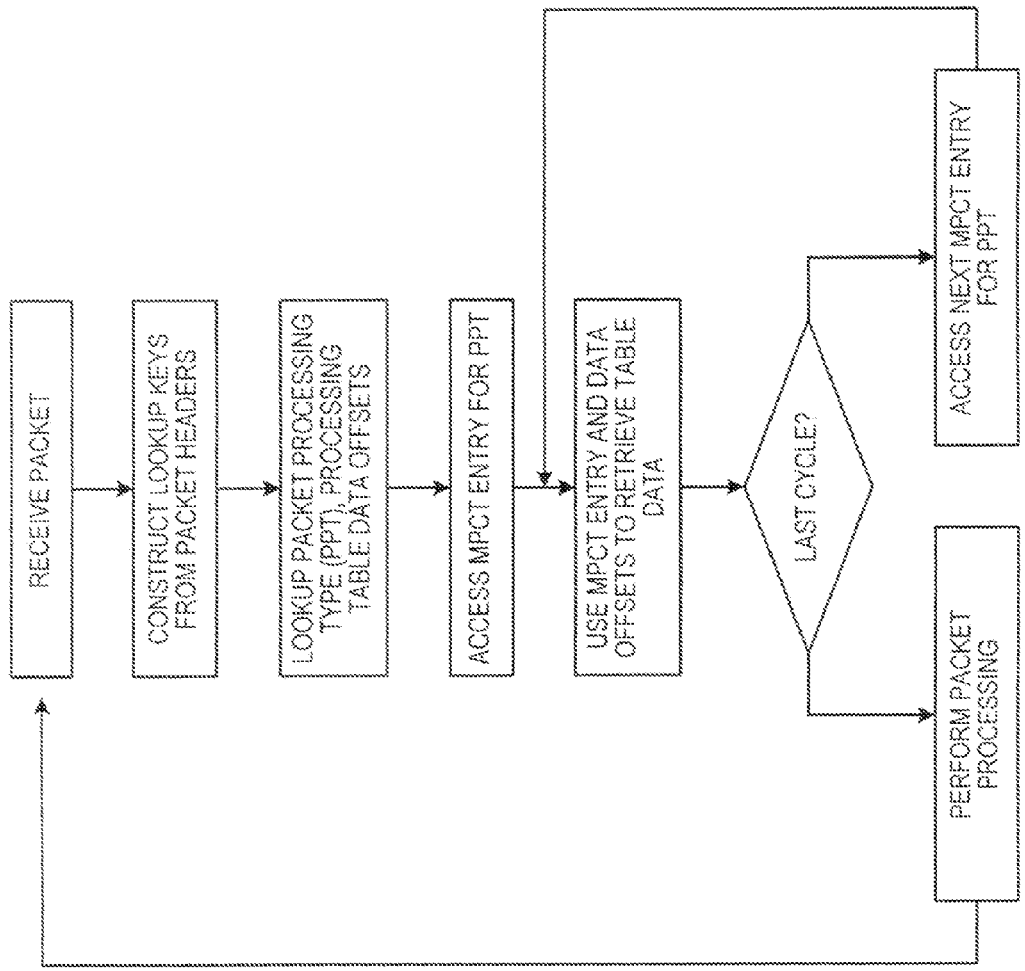

SYSTEM AND METHOD FOR FLEXIBLE MEMORY SYSTEM CONFIGURATION AND ACCESS

BACKGROUND

1. Field of the Invention

The present disclosure relates generally to packet network packet processors, and more particularly to memory systems and access methods for such processors.

2. Description of Related Art

Data packets (also called "frames" in some scenarios) placed on a packet-based network generally pass through one or more packet switches and/or routers as the packets traverse between the packet source and packet destination(s). Each switch/router receiving such a packet examines one or more headers on the packet to decide what processing tasks must be performed on the packet, and the appropriate egress interface(s) that the switch/router should use to forward the packet toward its destination(s). It is desirable that each switch/router process packets quickly, so as to reduce packet latency and avoid having to drop packets.

High-performance packet routers and switches use dedicated packet network packet processors to handle packets. FIG. 1 depicts a simplified view of a system 100 including a packet processor 110. Ingress buffers (not shown) internal and/or external to packet processor 110 queue packets received by one or more switch/router interfaces and awaiting processing by the packet processor. Egress buffers (also not shown) internal and/or external to packet processor 110 hold packets subsequent to processing by the packet processor and queued for forwarding out an appropriate switch router interface or interfaces.

Packet processor 110 typically must handle packets from many different source/destination pairs, and packets of many different types. Depending on these variables, different packets require different lookups and different processing. Lookup information is stored in tables in a memory accessible to the packet processor, e.g., memory 120 made up of two memory devices 120-0, 120-1. Each memory device can be one of the familiar solid-state memory device types, such as a Static Random Access Memory (SRAM), Dynamic Random Access Memory (DRAM), Flash memory, etc. In FIG. 1, each memory device is a 1 Mb×72-bit SRAM. Packet processor supplies an address signal to memory devices 120-0, 120-1 over 20 address lines A[0:19] (well-known control signals are also supplied over separate command lines, not shown). Data passes between each memory device and packet processor 110 over 72 dedicated data lines (DQ[0:71] and DQ[72:143] for memory devices 120-0 and 120-1, respectively). Thus in operation, devices 120-0 and 120-1 appear as one large 144-bit-wide memory. Various tables needed for packet processor operation are stored in different partitions of the memory.

The prior art packet processor/memory configuration is limited in the manner in which table information can be retrieved. For instance, if five tables must be accessed to retrieve five types of information for processing a packet, five separate accesses are required. For line rate processing of small packets, packet processing requiring many table read operations can quickly overwhelm the memory system, resulting in delays and undesired packet dropping to avoid buffer overflow.

BRIEF DESCRIPTION OF THE DRAWINGS

FIG. 3 shows an exemplary memory map according to an embodiment.

FIG. 4 illustrates a memory process configuration table according to an embodiment.

FIG. 5 includes a flowchart for packet processing according to an embodiment.

SUMMARY

In the present embodiment, a packet network processor memory device is comprised of a plurality of memory banks, some or all of which can be on separate memory devices, for storing a complete table entry in a horizontal look-up table at a single memory system address and for storing a complete table entry in a vertical look-up table at two or more memory system addresses.

DETAILED DESCRIPTION

Figure 1:
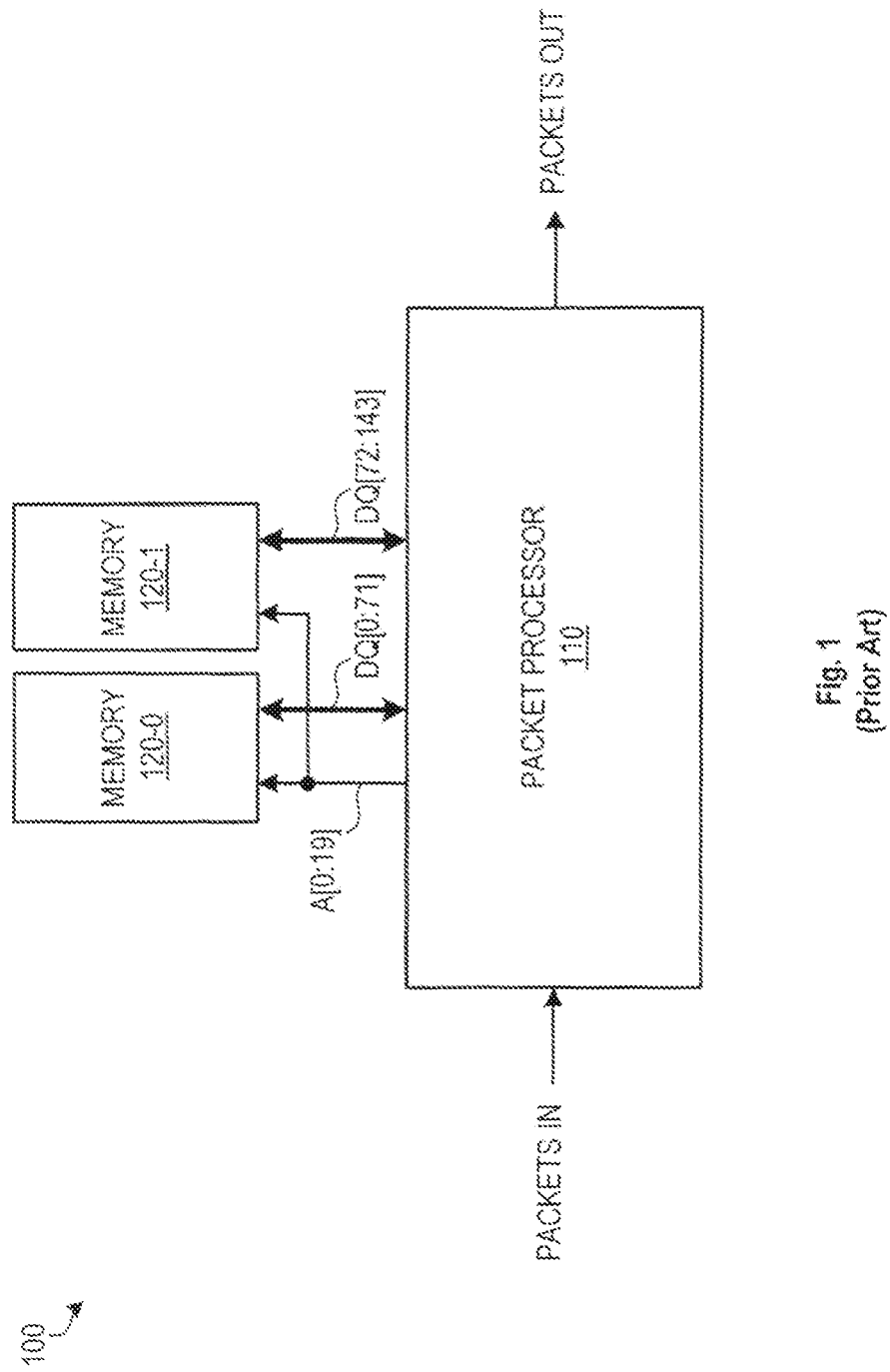
FIG. 1 contains a block diagram for a prior art packet processor and attached memory.
Figure 2:
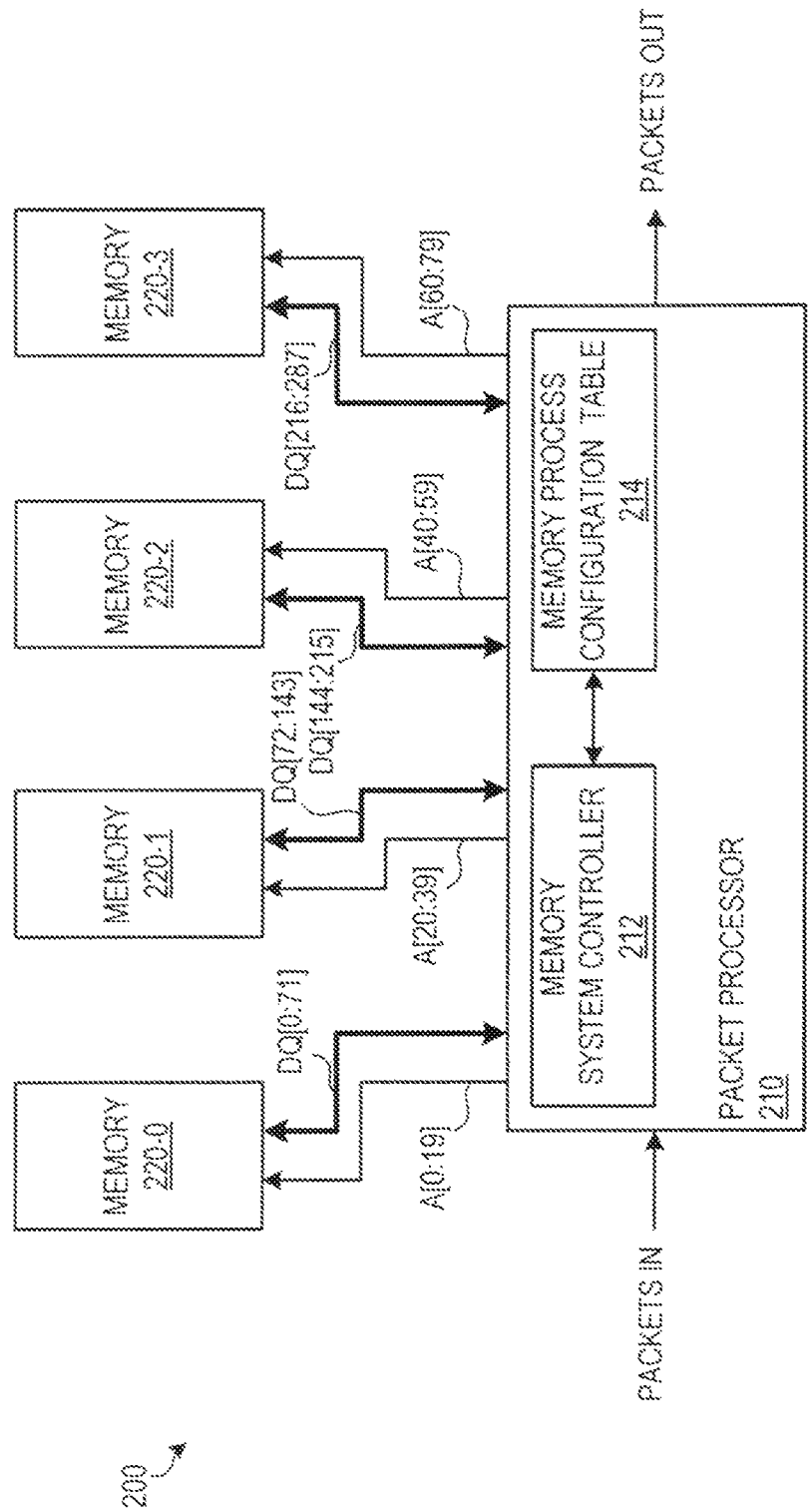
FIG. 2 contains a block diagram for a packet processor and attached memory according to an embodiment.

FIG. 2 contains a block diagram of a system 200 including a packet processor 210 and four memory devices 220-0 to 220-4. Although the memory devices can be of the same type as that used in prior art system 100, the system differs in that the memory is divided into four banks (here, one device per bank, but other divisions are possible) with separate address buses. Thus packet processor 210 addresses: memory device 220-0 using 20 address lines A[0:19]; memory device 220-1 using 20 address lines A[20:39]; memory device 220-2 using 20 address lines A[40:59]; and memory device 220-3 using 20 address lines A[60:79]. Each memory device communicates data with packet processor 210 over its own 72-bit data bus: DQ[0-71] for device 220-0; DQ[72-143] for device 220-1; DQ[144-215] for device 220-2; and DQ[216-287] for device 220-3.

A memory system controller 212 within packet processor 210 handles the memory accesses for the four memory banks concurrently. A memory process configuration table (MPCT) 214 stores access instructions for different types of processing configurations. An example shows one set of tables and two processing configurations, illustrating the use of an embodiment.

In the example including FIGS. 3 and 4, five different tables are stored in memory as follows:

TABLE 1

| | | Width | | | | |
|---|---|---|---|---|---|---|
| 0 | L2 FIB | 216 | 32K | 1-1-0-1 | H | 1 |
| 1 | L2 ACL | 144 | 8K | 0-1-0-1 | H | 1 |
| 2 | ING VLAN | 72 | 4K | 1-0-0-0 | H | 1 |
| 3 | EGR VLAN | 144 | 4k | 1-0-1-0 | H | 1 |
| 4 | NHOP | 144 | 16K | 0-0-1-0 | V | 2 |

In Table 1, the column "Table Name" indicates the usage of the table, i.e., "L2 FIB" is a Layer 2 Forwarding Information Base, "L2 ACL" is a Layer 2 Access Control List, "ING VLAN" is an Ingress Virtual Local Area Network table, "EGR VLAN" is an egress VLAN table, and "NHOP" is a Next Hop table. The column "Table Width" indicates the number of bits used to store one entry in each respective table, while the column "Table Size" indicates the maximum number of entries set aside for that table. The column "Mapping" shows which memory devices are used to store data for that table, e.g., the entry 1-1-0-1 for the L2 FIB indicates that memory devices 220-0, 220-1, and 220-3 store the L2 FIB entries, and memory device 220-2 does not. The column "Mode" can be either "H" for horizontal or "V" for vertical. A horizontal table has a complete logical entry stored at the same memory offset address within one or more of memory devices. A vertical table has a complete entry stored at two or more addresses within one or more of the memory devices. Thus the "Burst" column, which indicates a number of burst mode memory accesses required to return one table element, is always 1 for H mode entries and always two or greater for V mode entries.

FIG. 3 contains a memory map 300 set up for the memory devices 220-0 to 220-3. The L2 FIB and NHOP table share an overlapping (in this case completely overlapping) device memory address space, with the L2 FIB occupying that space on memory devices 220-0, 220-1, and 220-3, and the NHOP table occupying that space on memory device 220-2. The first two 72-bit words of an L2 FIB entry are stored respectively at the same address on devices 220-0 and 220-1 (the notation x[y:z] indicates entry x, start word y, end word z). The third 72-bit word of an L2 FIB entry is stored at the same address as the first two words, but on device 220-3. Each NHOP entry requires two adjacent memory addresses on 220-2 to store the two 72-bit words of an NHOP entry. The space allows for 2n L2 FIB entries and n NHOP entries.

The bottom portion of memory map 300 contains space for the ingress and egress VLAN tables and the L2 ACL. The ingress VLAN table is assigned space on memory 220-0, the egress VLAN is assigned space on memories 220-0 and 220-2, and the L2 ACL is assigned space on memories 220-1 and 220-3.

Due to the use of separate address lines for each memory device, any tables that are stored on non-overlapping devices can be accessed simultaneously. The set of memory lookup operations required for any particular packet are stored in memory process configuration table (MPCT), and accessed to perform an efficient set of memory operations. FIG. 4 shows two exemplary sets of memory access instructions stored in MPCT 214. The first set of instructions are stored at MPCT [0:2], and the second set of instructions are stored at MPCT[3:5]. Each instruction gives a base pointer and offset register pointer for a memory access, for each memory device. The base pointer is a base address for the table to be accessed. The offset register pointer describes a register location where memory system controller 212 can obtain the proper offset (essentially a table entry number) to combine with the base pointer to obtain a memory address for each memory device. Each instruction also gives a pointer to the MPCT 214 table index to be used to retrieve the next instruction for the memory process a "NULL" entry indicates that no more instructions are required by the process.

In FIG. 4, an access to "Entry Point 0" would be indicated by inspecting a packet and finding that it contains attributes that require an L2 FIB lookup, an ingress VLAN and an Egress VLAN lookup, and an L2 ACL lookup. Packet attributes can include, but are not limited to, a destination address, source address, IP address, VLAN membership and MAC address. The table instructs the memory system controller to construct addresses for and look up, during a first memory cycle, an L2 FIB entry. During a second memory cycle, the memory controller looks up both an egress VLAN entry and an L2 ACL entry. During a third memory cycle, the memory controller looks up an ingress VLAN entry.

Similarly, some other set of attributes will determine that the memory system controller 212 should use "Entry Point 1" into MPCT 214 to lookup L2 FIB, Next Hop, Ingress and Egress VLAN, and L2 ACL entries. The table instructs the memory system controller to construct addresses for and look up, during a first memory cycle, an L2 FIB entry and the first word of a Next Hop entry. During a second memory cycle, the memory controller looks up an ingress VLAN entry and the last word of a Next Hop entry. During a third memory cycle, the memory controller looks up an egress VLAN entry and Layer 2 ACL entry.

FIG. 5 contains a flowchart 500 for operation of packet processor 210. When the packet processor receives a packet, it constructs lookup keys from the packet headers. The lookup keys are used to access a Content Addressable Memory to determine a packet processing type (PPT) and processing table data offsets (e.g., constants to be used in packet processing and entry numbers for the tables). The PPT is either an index into, or can be used by the memory system controller to construct an index into, the MPCT. The memory system controller finds the MPCT entry, and uses it along with the data offsets to retrieve table data from the memory banks—the table data is stored in packet processor registers appropriate for its use. The MPCT entry also tells the memory system controller whether this is the last entry—if not, the next MPCT entry is accessed and used. Once the memory system controller has completed the table lookups, the retrieved values can be used to perform output packet processing, and then a new packet can be accepted.

In some embodiments, different memory processes to perform the same lookups can be stored in the MPCT, and used under different situations. For instance, in a pipelined system where the next two packet operations are known, it may be possible to derive for some neighboring packet types an overlapping two-packet table access process that takes less time than performing two single-packet processes. Also, the MPCT may have alternate processes pre-stored for use in failure of a memory device (the system would have to rearrange the tables into the usable banks as well). A lower-power operation process can also be stored and used when the packet processor is lightly loaded.

Although the embodiments described use one address formation unit for each memory bank, address formation units could be dedicated instead to each table. The MPCT in some embodiments also contain instructions telling the memory controller (or some other unit) where to place the different entry parts retrieved during each memory access.

Although several embodiments and alternative implementations have been described, many other modifications and implementation techniques will be apparent to those skilled in the art upon reading this disclosure. Different MPCT processes need not have their own contiguous block of entries—pointers allow the entries to be intermingled. Multiple processes could also point to a common tail portion of the memory operations in the MPCT, allowing for some savings in the size needed for the MPCT. The numbers shown for banks, number of devices per bank, data width per device, table width, etc., are merely exemplary.

Although the specification may refer to "an", "one", "another", or "some" embodiment(s) in several locations, this does not necessarily mean that each such reference is to the same embodiment(s), or that the feature only applies to a single embodiment.

We claim:
1. A packet network processor memory system comprising:
a plurality of memory banks storing a complete logical entry in a horizontal look-up table at the same offset address in the memory system and storing a complete entry in a vertical look-up table at two or more memory system addresses, the horizontal and vertical look-up tables comprising different types of packet forwarding information.

2. The packet network processor memory system of claim 1 wherein the plurality of memory banks are separately and concurrently programmable.

3. The packet network processor memory system of claim 1 wherein each of the plurality of memory banks comprises a separate memory device.

4. The packet network processor memory system of claim 1 wherein the complete horizontal or vertical table entry is comprised of some or all of the information needed to process a packet of information.

5. The packet network processor memory system of claim 1 wherein the horizontal or vertical look-up tables are comprised of one or more of a layer 1 forwarding information base, a layer 2 access control list, ingress VLAN information, egress VLAN information and Next Hop information.

6. The packet network processor memory system of claim 1 wherein the packet network processor comprises a router or a network switching device.

7. A packet network processor memory system comprising:
   a horizontal table having a complete entry stored at a single memory address associated with one or more memory banks and a vertical table having a complete entry stored at two or more addresses associated with one or more of the memory banks.

8. The packet network processor memory system of claim 7 wherein the one or more memory banks are separately and concurrently programmable.

9. The packet network processor memory system of claim 7 wherein each of the one or more memory banks comprises a separate memory device.

10. The packet network processor memory system of claim 7 wherein the complete horizontal or vertical table entry is comprised of some or all of the information needed to process a packet of information.

11. The packet network processor memory system of claim 7 wherein the horizontal or vertical look-up tables are comprised of one or more of a layer 1 forwarding information base, a layer 2 access control list, ingress VLAN information, egress VLAN information and Next Hop information.

12. The packet network processor memory system of claim 7 wherein the packet network processor comprises a router or a network switching device.

13. A method of accessing look-up table entries in a network processor memory system comprising:
   the network processor memory system detecting attributes in a received packet of information;
   using the detected attributes to derive an index into the network processor memory; and
   using the same offset address to the network processor memory system to access a complete logical entry in a horizontal look-up table or using two or more network processor memory system addresses to access a complete entry in a vertical look-up table.

14. The method of claim 13 wherein the detected packet attributes are one or more of an IP source address, and IP destination address and a MAC address.

15. The method of claim 13 wherein the index is comprised of one or more network processor memory system addresses.

16. The method of claim 13 wherein the complete horizontal or vertical table entry is comprised of some or all of the information needed to process a packet of information.

17. The method of claim 13 wherein the horizontal or vertical look-up tables are comprised of one or more of a layer 1 forwarding information base, a layer 2 access control list, ingress VLAN information, egress VLAN information and Next Hop information.

18. The method of claim 13 wherein the one or more network processor memory addresses are comprised of a base pointer and an offset register pointer.

19. The method of claim 13 wherein the network processor memory system comprises a router or a network switching device.

\* \* \* \* \*